United States Patent [19]

Arakawa et al.

[11] Patent Number: 4,516,538
[45] Date of Patent: May 14, 1985

[54] INTAKE MANIFOLD FOR INTERNAL COMBUSTION ENGINES

[75] Inventors: Tetsuo Arakawa, Asaka; Kenichi Nagahiro, Kawagoe, both of Japan

[73] Assignee: Honda Giken Kogyo Kabushiki Kaisha, Tokyo, Japan

[21] Appl. No.: 533,149

[22] Filed: Sep. 16, 1983

[30] Foreign Application Priority Data

Sep. 21, 1982 [JP] Japan .................. 57-142898[U]

[51] Int. Cl.³ ............................................ F02M 25/00
[52] U.S. Cl. ............................. 123/52 M; 123/59 R; 123/432
[58] Field of Search ........ 123/52 M, 52 MC, 52 MV, 123/59 R, 308, 432

[56] References Cited

U.S. PATENT DOCUMENTS

| | | | |
|---|---|---|---|
| 3,850,153 | 11/1974 | Sigwald | 123/52 M |
| 3,878,826 | 4/1975 | Date et al. | 123/52 M |
| 3,916,850 | 11/1975 | Date et al. | 123/52 M |
| 4,072,133 | 2/1978 | McWhirter | 123/52 MV |
| 4,099,500 | 7/1978 | Nakano et al. | 123/52 M |
| 4,108,124 | 8/1978 | Nakagawa et al. | 123/52 M |
| 4,361,123 | 11/1982 | Hori et al. | 123/432 |

Primary Examiner—Craig R. Feinberg
Attorney, Agent, or Firm—Arthur L. Lessler

[57] ABSTRACT

In an internal combustion engine, an intake manifold has a main distributing chamber and an auxiliary distributing chamber disposed to overlap with the main distributing chamber at a location inward thereof. The main distributing chamber is divided by a partition wall into a primary distributing chamber and a secondary distributing chamber. The partition wall has a boss through which is formed an intake guide passage having one end opening in the auxiliary distributing chamber and directed toward a substantially central location of the chamber. The primary distributing chamber, the secondary distributing chamber and the intake guide passage leading to the auxiliary distributing chamber have respective mixture-inlet ports opening in a carburetor-mounting surface formed on the outer surface of the intake manifold and arranged thereon in a compact array. Thus, the intake guide passage has a simplified configuration, and also the intake manifold can have a compact size.

5 Claims, 7 Drawing Figures

INTAKE MANIFOLD FOR INTERNAL COMBUSTION ENGINES

BACKGROUND OF THE INVENTION

This invention relates to an intake manifold for internal combustion engines, and more particularly to improvements in the structure of the auxiliary intake passage system of an internal combustion engine.

An intake manifold for an internal combustion engine is well known which is arranged between a carburetor unit and the main body of the engine and is formed therein with a plurality of main intake passages for feeding a lean mixture to respective main combustion chambers of the engine, a main distributing chamber from which diverge the main intake passages, a plurality of auxiliary intake passages for feeding a rich mixture to respective auxiliary combustion chambers of the engine, and an auxiliary distributing chamber from which diverge the auxiliary intake passages, the above main distributing chamber being divided by a partition wall located at the mixture-inlet portion of the same chamber into a primary distributing chamber for distributing a mixture to the main intake passages for low-load operation of the engine and a secondary distributing chamber for distributing a mixture to the main intake passages for high-load operation of the engine.

In such type intake manifold, as known from Japanese Provisional Patent Publication (Kokai) No. 53-57315, mixture-inlet ports leading, respectively, to the primary distributing chamber, the secondary distributing chamber and the auxiliary distributing chamber are usually arranged in a line extending substantially normally to the plane of juncture between the intake manifold and the main body of the engine so as to obtain even distribution of the mixtures to the main combustion chambers and the auxiliary combustion chambers. Due to the limited size of the intake manifold, the main distributing chamber and the auxiliary distributing chamber are disposed to overlap with each other in a vertical direction of the intake manifold with the latter located inwardly of the former. This arrangement necessitates locating the mixture-inlet port leading to the auxiliary distributing chamber through the surface of a thick lateral wall of the main distributing chamber such that the mixture-inlet port communicates with the auxiliary distributing chamber by way of an intake guide passage which is formed through the above lateral wall of the main distributing chamber. That is, the intake guide passage extends around the main distributing chamber, and therefore its internal flow path is inevitably long and complicate in configuration, providing the possibility of uneven distribution of the mixture from the auxiliary distributing chamber to the auxiliary intake passages due to increased flow resistance and turbulence in the intake guide passage, etc.

Further, the aforesaid linear arrangement of the mixture-inlet ports leading to the primary and secondary distributing chambers and the auxiliary distributing chamber necessitates prolonging the size of the carburetor-mounting surface on the outer surface of the intake manifold in a direction in which are arranged the mixture-inlet ports. This in turn necessitates designing the intake manifold and a carburetor unit mounted on the mounting site large in size.

SUMMARY OF THE INVENTION

It is an object of the invention to provide an intake manifold for internal combustion engines, in which the auxiliary intake passage system has a simplified flow path configuration, thereby having an enhanced degree of even distribution of the mixture into the individual auxiliary intake passages.

It is a further object of the invention to provide an intake manifold for internal combustion engines, in which the mixture-inlet ports opening in the carburetor-mounting surface on the outer surface of the intake manifold and leading to the main distributing chamber and the auxiliary distributing chamber are arranged in a compact array, thereby compacting the size of the intake manifold as well as the size of a carburetor unit to be mounted on the carburetor-mounting surface.

According to the invention, an improved intake manifold for an internal combustion engine is provided which is of the type formed therein with a plurality of main intake passages, a plurality of auxiliary intake passages, a main distributing chamber from which diverge the main intake passages, and an auxiliary distributing chamber from which diverge the auxiliary intake passages, and which is disposed to overlap with the main distributing chamber at a location inward thereof, the main distributing chamber being divided into a primary distributing chamber and a secondary distributing chamber, by a partition wall located at a mixture-inlet portion of the main distributing chamber. The above partition wall has a boss through which is formed an intake guide passage which opens at one end in an outer surface of the intake manifold and communicates at the other end with the auxiliary distributing chamber. The above other end of the intake guide passage opens in the auxiliary distributing chamber and is directed toward a substantially central location thereof.

Preferably, the mixture-inlet portion of the main distributing chamber includes a carburetor-mounting surface forming part of the outer surface of the intake manifold, in which are formed first and second mixture-inlet ports leading, respectively, to the primary and secondary distributing chambers of the main distributing chamber, and a third mixture-inlet port leading to the intake guide passage of the auxiliary distributing chamber, with the third mixture-inlet port located at a location intermediate between the first and second mixture-inlet ports.

The above and other objects, features and advantages of the invention will be more apparent from the ensuing detailed description taken in conjunction with the accompanying drawings.

DETAILED DESCRIPTION

The invention will now be described in detail with reference to the drawings.

Figure 1:
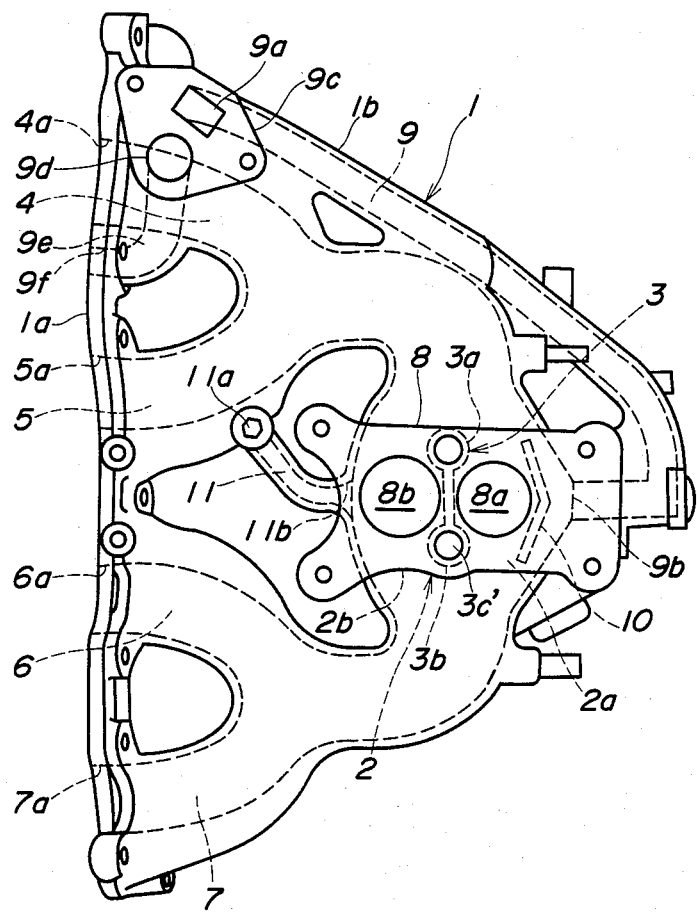
FIG. 1 is a top plan view of an intake manifold for internal combustion engines according to an embodiment of the invention, specifically showing the main intake passage system thereof.

Referring first to FIG. 1, there is illustrated an embodiment of the intake manifold according to the invention, which is to be mounted on the main body of an internal combustion engine, not shown. The intake manifold 1, which is assumed to be horizontally disposed in the embodiment, is formed therein with a main distributing chamber 2 which is divided into a primary distributing chamber 2a for distributing a mixture to main intake passages 4–7, hereinafter referred to for low-load operation of the engine and a secondary distributing chamber 2b for distributing a mixture to the same intake passages for high-load operation of the engine, by a partition wall 3 integrally formed in the interior of the manifold at a substantially central location of the main distributing chamber 2. The partition wall 3 is integrally formed with generally cylindrical bosses 3a and 3b at its opposite ends as viewed in directions of flows of a mixture in the main distributing chamber. The main intake passages 4, 5 are connected to one open end of the main distributing chamber 2, while the other main intake passages 6, 7 are connected to the other open end of the same chamber, in a manner horizontally diverging from the main distributing chamber 2. These main intake passages 4–7 open at ends 4a–7a in a front end face 1a of the intake manifold 1. On the other hand, the primary and secondary distributing chambers 2a, 2b communicate, respectively, with mixture-inlet ports 8a and 8b formed in a carburetor-mounting surface 8 formed on an upper surface of the intake manifold 1.

An exhaust gas recirculating passage 9 is formed in the intake manifold 1 and extends along a lateral side surface 1b of same, with one end 9a opening in a mounting surface 9c formed at a location close to the front end face 1a of the intake manifold 1, on which an exhaust gas flow control valve, not shown, is to be mounted, and the other end 9b opening in the primary distributing chamber 2a at a substantially central location thereof. A partition wall 10 is integrally formed in the primary distributing chamber 2a in a manner facing the open end 9b of the exhaust gas recirculating passage 9 at a predetermined interval therefrom. A further exhaust gas recirculating passage 9e is formed in the intake manifold 1, with one end 9f opening in the front end face 1a of the manifold 1 and the other end communicating with an opening 9d in the control valve-mounting surface 9c. The openings 9a, 9d can be communicated with each other by way of the exhaust gas flow control valve when it is mounted on the mounting surface 9c. Thus, the passages 9, 9e cooperate to form a continuous exhaust gas recirculating passageway extending between the exhaust passage, not shown, of the engine and the intake manifold 1.

A blow-by gas returning passage 11 is formed integrally on the outer surface of the intake manifold 1, with one end 11a projected outwardly of the upper surface of the intake manifold 1 and the other end 11b opening in the secondary distributing chamber 2b at a substantially central location thereof, respectively.

Figure 3:
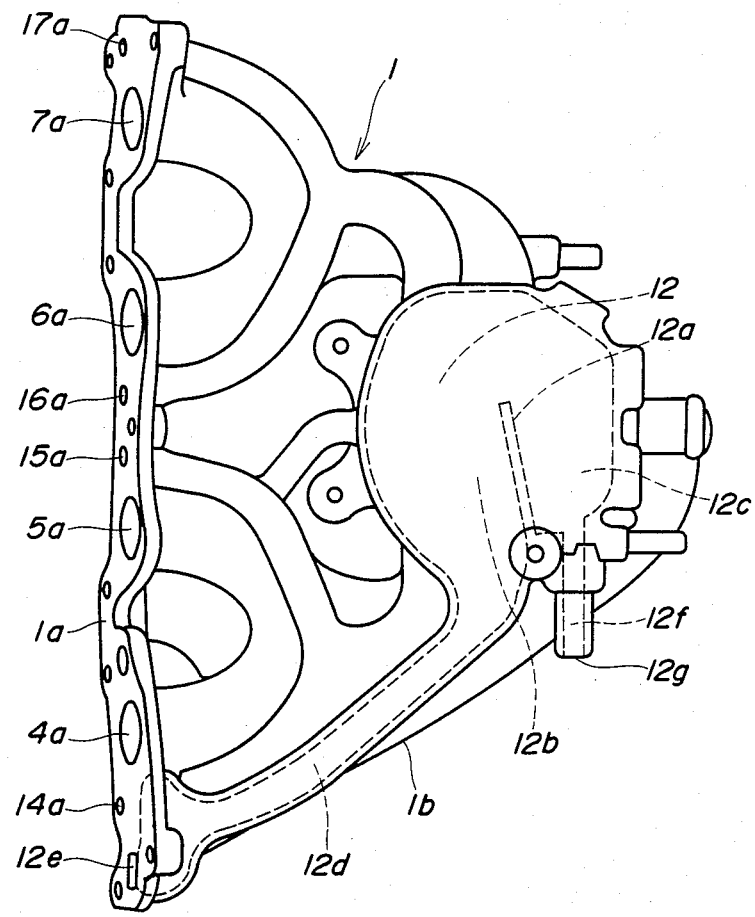
FIG. 3 is a bottom plan view of the intake manifold of FIG. 1.
Figure 4:
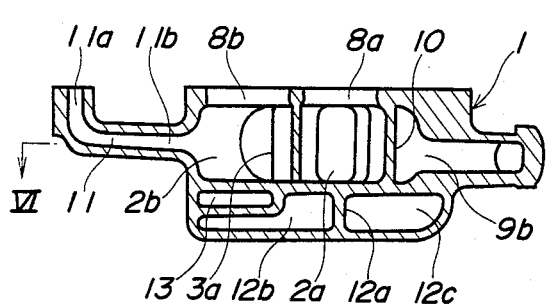
FIG. 4 is a sectional view taken along line IV—IV in FIG. 2.
Figure 5:
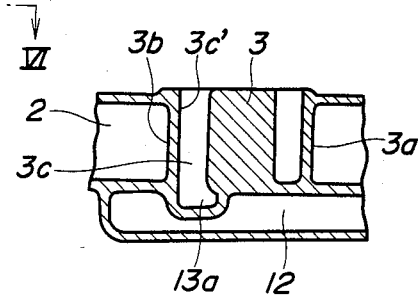
FIG. 5 is a sectional view taken along line V—V in FIG. 2.
Figure 6:
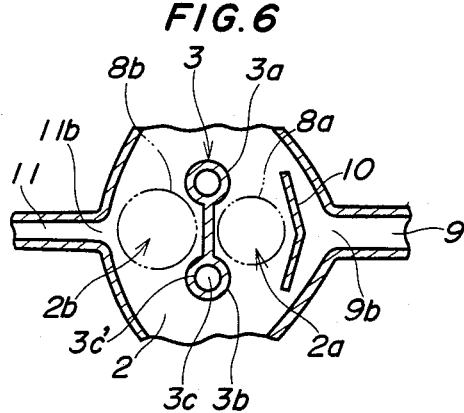
FIG. 6 is a sectional view taken along line VI—VI in FIG. 4.
Figure 7:
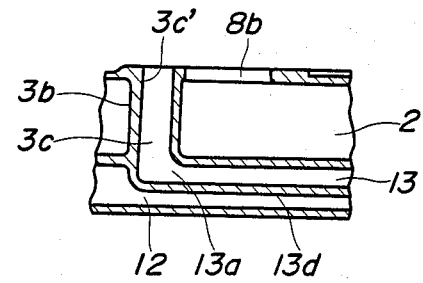
FIG. 7 is a sectional view taken along line VII—VII in FIG. 2.

As shown in FIG. 3, a hot water-heating chamber 12 is formed in the intake manifold 1 at a location downward of the main distributing chamber 2, which is divided by a partition wall 12a into two chambers 12b and 12c communicating with each other. The first chamber 12b extends along the lateral side wall 1b of the intake manifold 1 and communicates with one end of a passage 12d located below the exhaust gas recirculating passage 9 in FIG. 1, which in turn has its other end 12e opening in the front end face 1a of the intake manifold 1. The second chamber 12c communicates with a further passage 12f projected laterally outwardly of the intake manifold 1.

Figure 2:
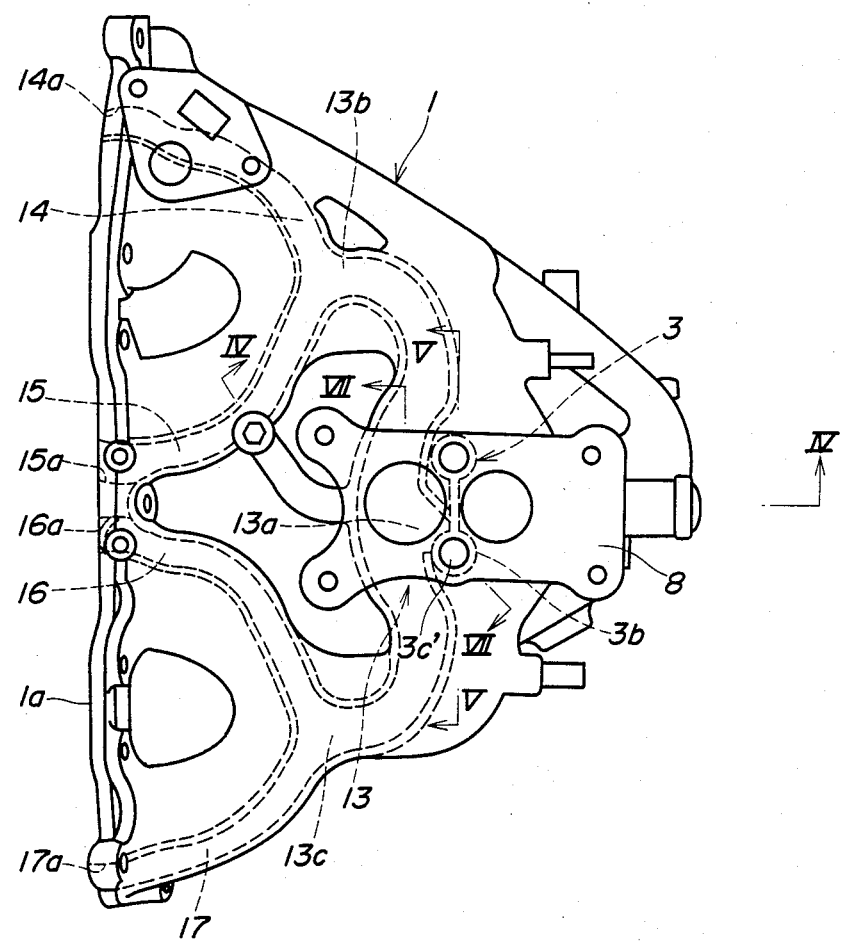
FIG. 2 is a view similar to FIG. 1, specifically showing the auxiliary intake passage system thereof.

As shown in FIG. 2 and FIGS. 4 through 7, an auxiliary distributing chamber 13 is formed in the intake manifold 1 at a location intermediate between the secondary distributing chamber 2b of the main distributing chamber 2 and the water chamber 12 and lies substantially parallel with the secondary distributing chamber 2b partitioned therefrom by a partition wall 13d. The auxiliary distributing chamber 13 has an opening 13a which directly communicates with an intake guide passage 3c which is formed through the boss 3b of the aforementioned partition wall 3 in a manner extending along the axis of the boss 3b, and opens at one end 3c' in the carburetor-mounting surface 8. As seen in FIG. 2, the opening 13a is directed toward a substantially central location of the auxiliary distributing chamber 13 so as to direct a mixture guided there through the intake guide passage 3c toward the same substantially central location of the chamber 13 so that the mixture can be evenly distributed to the auxiliary intake passages 14–17. The open end or mixture-inlet port 3c' of the intake guide passage 3c is located on the carburetor-mounting surface 8 at a location intermediate between the mixture-inlet ports 8a, 8b of the primary and secondary distributing chambers 2a, 2b, in such a manner that the three mixture-inlet ports 3c', 8a and 8b are disposed on the carburetor-mounting surface 8 in a generally triangular array. The auxiliary distributing chamber 13 has its opposite ends 13b and 13c connected, respectively, to auxiliary intake passages 14, 15 and 16, 17 which horizontally diverge from the auxiliary distributing chamber 13 and have respective ends 14a–17a opening in the front end face 1a of the intake manifold 1. The auxiliary intake passages 14–17 extend at a level lower than the main intake passages 4–7 at their portions between their junctions with the auxiliary distributing chamber 13 and intermediate points between the same junctions and the front end face 1a of the intake manifold 1, while they extend at the same level with the latter passages 4–7 and parallel therewith, at their portions between the above intermediate points and the front end face 1a.

The intake guide passage 3c merely extends straight through the boss 3b vertically of the intake manifold 1, and thus has a simplified and shortened path configuration. As a consequence, the flow in the intake guide passage 3c undergoes reduced flow resistance and has a less possibility of occurrence of turbulence, resulting in smooth and even distribution of a mixture introduced into the auxiliary distributing chamber 13 through the intake guide passage 3c, to the auxiliary intake passages 14–17. Furthermore, by virtue of the formation of the intake guide passage 3c through the boss 3b, the mixture-inlet ports 8a, 8b, 3c' leading, respectively, to the primary and secondary distributing chambers 2a, 2b and the auxiliary distributing chamber 13 can be arranged on the carburetor-mounting surface 8 in a compact array and along a shortened line, thereby enabling to mount a smaller-sized carburetor on the mounting surface 8 and also to simplify and make the intake manifold 1 compact in size.

The mixture-inlet ports 8a, 8b and 3c' formed in the carburetor-mounting surface 8 will be connected to respective passages formed in a carburetor unit, not shown, when the latter is mounted on the same mounting surface 8 at locations downstream of respective ones of a low-load throttle valve, a high-load throttle valve and an auxiliary throttle valve mounted in the same carburetor unit. The ends 4a–7a of the main intake passages 4–7 and the ends 14a–17a of the auxiliary intake passages 14–17 will be connected to corresponding ones of main combustion chambers and auxiliary combustion chambers, not shown, formed in the main body of an engine mounted on the front end face 1a of the intake manifold 1. A flow control valve, not shown, will be mounted onto the valve-mounting surface 9c in a manner having its interior passage aligned with the openings 9a, 9d in the mounting surface 9c, and the open end 9f of the exhaust gas recirculating passage 9e will be connected to the exhaust passage, not shown, of the engine. The open end 11a of the blow-by gas returning passage 11 will be connected to a blow-by gas returning passage, not shown, formed in the engine. Further, the open ends 12e, 12g of the water chamber 12 will be connected, respectively, to a portion of an engine cooling water passage, not shown, in the cylinder head, and to a portion of the same passage in the radiator of the engine.

With the above arrangement, mixtures from the carburetor unit are supplied through the mixture-inlet ports 8a, 8b and 3c' into the respective primary and secondary distributing chambers 2a, 2b and the auxiliary distributing chamber 13 in the intake manifold 1. The mixtures thus fed into the primary and secondary distributing chambers 2a, 2b are evenly distributed into the main intake passages 4–7 through the opposite ends of the distributing chambers 2a, 2b, and then delivered into the corresponding main combustion chambers of the engine. On the other hand, the mixture fed into the auxiliary distributing chamber 13 is evenly distributed into the auxiliary intake passages 14–17 through the opposite ends of the same distributing chamber 13, and then delivered into the corresponding auxiliary combustion chambers of the engine.

Part of the exhaust gases emitted from the engine into the exhaust passage of same is returned through the exhaust gas recirculating passage 9e of the intake manifold 1, the exhaust gas flow control valve and the other exhaust gas recirculating passage 9 into the primary distributing chamber 2a where it is mixed with the mixture supplied from the carburetor unit and delivered therewith into the main combustion chambers of the engine.

Further, a blow-by gas from the engine is guided through the blow-by gas returning passage 11 into the secondary distributing chamber 2b where it is mixed with the mixture and delivered into the main combustion chambers of the engine.

Hot water from the cooling system of the engine is guided through the passage 12d in the intake manifold 1 into the water chamber 12 where it heats the mixtures in the main distributing chamber 2 and the auxiliary distributing chamber 13 located just above the water chamber 12, up to a temperature suitable for sufficient combustion of the mixtures.

While a preferred embodiment of the invention has been described, variations thereto will occur to those skilled in the art within the scope of the present inventive concepts which are delineated by the following claims.

What is claimed is:

1. In an intake manifold for an internal combustion engine, said engine having a plurality of main combustion chambers, a plurality of auxiliary combustion chambers communicating with respective ones of said main combustion chambers, and a carburetor unit, said intake manifold having:

an interior thereof formed with a plurality of main intake passages connected to respective ones of said main combustion chambers, a plurality of auxiliary intake passages connected to respective ones of said auxiliary combustion chambers, a main distributing chamber from which diverge said main intake passages, and an auxiliary distributing chamber from which diverge said auxiliary intake passage in two substantially horizontally opposite directions, said auxiliary distributing chamber being disposed to overlap with said main distributing chamber at a location downward thereof in a vertical direction, said main distributing chamber and said auxiliary distributing chamber being adapted for connection to said carburetor unit at a location downstream thereof, said intake manifold having a partition wall extending through said main distributing chamber along the entire length thereof in a direction of flow of a mixture therein and dividing said main distributing chamber into a primary distributing chamber and a secondary distributing chamber, the improvement wherein said partition wall has a boss, and an intake guide passage formed through said boss, said intake guide passage opening at one end thereof in an outer surface of said intake manifold, said outer surface forming a carburetor-mounting surface, and opening at another end thereof in said auxiliary distributing chamber, said other end of said intake guide passage being directed toward a horizontally substantially central location of said auxiliary distributing chamber.

2. An intake manifold as claimed in claim 1, wherein said boss of said partition wall is located at a location corresponding to said substantially central location of said auxiliary distributing chamber, said intake guide passage extending through said boss substantially linearly from said one end thereof to said other end thereof along the axis of said boss.

3. An intake manifold as claimed in claim 1, wherein said partition wall has one end located in a direction of flow of said mixture in said main distributing chamber, said boss being formed at said one end of said partition wall.

4. An intake manifold as claimed in claim 1, wherein first and second mixture-inlet ports formed in said carburetor-mounting surface and leading, respectively, to said primary distributing chamber and said secondary distributing chamber of said main distributing chamber, and a third mixture-inlet port formed in said carburetor-mounting surface and leading to said intake guide passage of said auxiliary distributing chamber, said third mixture-inlet port being located at a location intermediate between said first mixture-inlet port and said second mixture-inlet port.

5. An intake manifold as claimed in claim 4, wherein said first, second and third mixture-inlet ports are arranged on said carburetor-mounting surface in a substantially triangular array.

* * * * *